United States Patent
Buzzetti

(10) Patent No.: US 6,954,262 B2
(45) Date of Patent: *Oct. 11, 2005

(54) AUTOMATED FIBER OPTIC INSPECTION SYSTEM

(76) Inventor: Mike Buzzetti, 4401 El Camino Real #D, Atascadero, CA (US) 93422

( * ) Notice: Subject to any disclaimer, the term of this patent is extended or adjusted under 35 U.S.C. 154(b) by 298 days.

This patent is subject to a terminal disclaimer.

(21) Appl. No.: 10/278,038

(22) Filed: Oct. 21, 2002

(65) Prior Publication Data

US 2003/0174875 A1 Sep. 18, 2003

Related U.S. Application Data

(60) Provisional application No. 60/365,442, filed on Mar. 18, 2002.

(51) Int. Cl.[7] .............................. G01N 21/00; G06K 9/00
(52) U.S. Cl. .................. 356/73.1; 356/237.1; 382/141
(58) Field of Search .............................. 385/53, 55, 60, 385/72, 73, 77, 78, 88, 92, 37, 117, 119, 120, 137; 356/73.1, 237.1; 29/705, 720, 795; 348/125; 382/141, 145, 152

(56) References Cited

U.S. PATENT DOCUMENTS

| | | | |
|---|---|---|---|
| 4,596,037 A | 6/1986 | Bouchard et al. | |
| 5,179,419 A | 1/1993 | Palmquist et al. | |
| 5,253,412 A * | 10/1993 | Fukuoka et al. | ............ 29/566.3 |
| 5,408,537 A | 4/1995 | Major | |
| 5,459,564 A | 10/1995 | Chivers | |
| 5,729,622 A | 3/1998 | Csipkes et al. | |
| 5,854,852 A | 12/1998 | Csipkes et al. | |
| 5,862,250 A | 1/1999 | Csipkes et al. | |
| 5,946,099 A | 8/1999 | Ota et al. | |
| 6,011,616 A | 1/2000 | Volcy et al. | |
| 6,034,718 A | 3/2000 | Hattori | |
| 6,215,555 B1 | 4/2001 | Chivers | |
| 6,466,310 B2 * | 10/2002 | Nguyen et al. | ............ 356/73.1 |
| 6,799,370 B2 * | 10/2004 | Shekel et al. | ................. 29/854 |
| 2003/0174319 A1 | 9/2003 | Buzzetti | |

FOREIGN PATENT DOCUMENTS

| JP | 02-148371 | 6/1990 |
|---|---|---|
| JP | 10-300676 | 11/1998 |

* cited by examiner

Primary Examiner—Zandra V. Smith
Assistant Examiner—Gordon J. Stock, Jr.
(74) Attorney, Agent, or Firm—Thomas F. Lebens; Sinsheimer, Schiebelhut & Baggett

(57) ABSTRACT

An automated fiber optic inspection system consists of an inspection station having a motion control system that moves a camera in three dimensions in response to motion control software that is integrated with inspection software. The inspection system automatically inspects fiber optic connectors located in a fixture or installed in housings on a fiber optic card or board and moves the camera from one connector to the other in the fixture or card until all connectors have been inspected. The system stores motion profiles for various types of fixtures and cards.

5 Claims, 10 Drawing Sheets

AUTOMATED FIBER OPTIC INSPECTION SYSTEM

The present patent document is a non-provisional patent document claiming the benefit under 35 U.S.C. § 119(e) of U.S. provisional patent application No. 60/365,442, filed Mar. 18, 2002 of Buzzetti for AUTOMATED FIBER OPTIC INSPECTION SYSTEM incorporated herein by reference.

BACKGROUND OF THE INVENTION

The present invention relates to automated inspection systems and methods, and more particularly to automated inspection systems and methods for fiber optic connectors and cards.

Analyzing fiber optic connector end faces for defects is required to effectively weed out those connectors and fiber optic cards that may not deliver acceptable performance to those who use them. With the abundant quantity of multi-fiber fiber optic connectors and fiber optic cards using such connectors being manufactured, there exists a need for a system and method for quickly inspecting a number of connector ends and determining those that are defective.

Traditionally, a camera or a microscope individually magnifies and focuses on each connector end. This is the case for connectors in a polishing fixture as well as those installed in a housing on a fiber optic card, for example. An individual then either manually, or by use of a computer program, picks out particular defects. The time it takes to center the image, focus, inspect the image and then manually center a new connector end, and then focus and inspect the image makes the inspection process very tedious and time consuming, especially when inspecting large numbers of connector ends.

Therefore, a need exists to be able to automatically inspect a number of connector ends with little human intervention.

The present invention advantageously addresses the above and other needs.

SUMMARY OF THE INVENTION

The present invention advantageously addresses the needs above as well as other needs by providing an automated fiber optic inspection system and method for fiber optic connectors.

In one embodiment, the invention can be characterized as a method for vision inspection of optical connectors that comprises placing a plurality of optical connectors into a corresponding plurality of fiber optic housings on an edge of a card, retrieving a motion profile for said card from a motion profile database, centering an image of one of the plurality of optical connectors by moving a camera relative to the fixture using the motion profile, and focusing the camera on the one of the plurality of optical connectors. Then, the one of the plurality of optical connectors is inspected using the camera. The next steps include centering an image for another of the plurality of optical connectors by moving the camera relative to the card using the motion profile, focusing the camera on the other of the plurality of optical connectors, and inspecting the other of the plurality of optical connectors.

In another embodiment, the invention can be characterized as a system for vision inspection of optical connectors comprising a motion control system comprising a motion controller for moving a camera relative to a card in at least two dimensions, the card comprising a plurality of positions within fiber optic housings on the card for holding a plurality of optical connectors. An image interface is coupled to the processor for receiving an image of one of the plurality of optical connectors from said camera. An inspection software subsystem is coupled to the processor for inspecting the one of the plurality of optical connectors. A motion control software subsystem is coupled to the processor for generating motion control signals, wherein the control signals are received by the motion control system. The motion control system moves the camera relative to the one of the plurality of optical connectors in response to the control signals.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
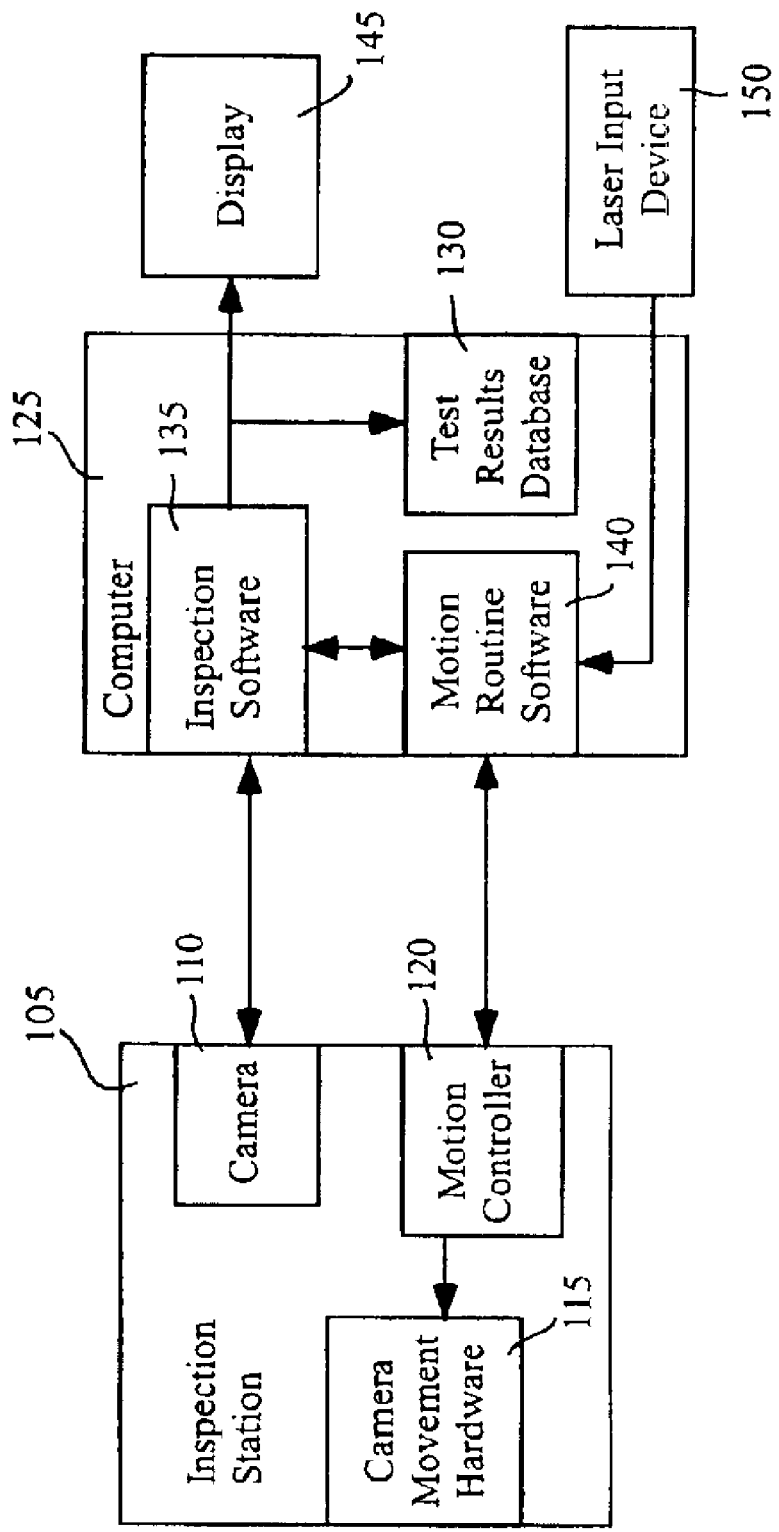
FIG. 1 is a high level block diagram of an automated fiber optic inspection system according to the present invention.

Referring first to FIG. 1, shown is a high level block diagram of an automated fiber optic inspection system according to one embodiment of the present invention.

Shown is an inspection station 105 including a camera 110, camera movement hardware 115, and a motion controller 120. Also shown is a computer 125 having a test results database 130, an inspection software 135, and a motion routine software 140. Lastly, a display 145 and user input device 150 are shown.

The inspection station 105 has a motion controller 120 that is in communication, e.g., electrical communication, with the camera movement hardware 115. The motion controller 120 is also in communication, e.g., electrical communication, with the computer 125 and ultimately in logical communication with the motion routine software 140 on the computer 125. The camera 110 is in communication, e.g., electrical communication, with the computer 125 and ultimately is in logical communication with the inspection software 135. The inspection software 135 is in logical communication with the motion routine software 140, test results database 130 and the display 145, which is coupled to the computer 125. Finally, the motion routine software 140 is in logical communication with the motion controller 120 and the user input device 150, which is coupled to the computer 125.

A user initiates a fiber optic connector test through the user input device, e.g., a keyboard and/or a mouse. The motion routine software 140 on the computer 125 controls the motion controller 120, which in turn controls the movement of the camera movement hardware 115. The camera movement hardware 115 physically moves the camera 110 to a specified location below a specified fiber optic connector, according to a motion profile that is retrieved from the database and used by the motion routine software 140, and images from the camera 110 are communicated directly to the inspection software 135. The inspection software 135, such as the inspection software available from COGNEX corporation of Massachusetts, is in communication with the motion routine software 140 in order to coordinate the correct movement of the camera 110 once inspection of a particular fiber optic connector is complete. The inspection software 135 uses data from the images from the camera 110 to inspect fiber optic connectors. Once all the connectors are inspected, the test results are stored in the teat results database and output on the display 145.

Figure 2:
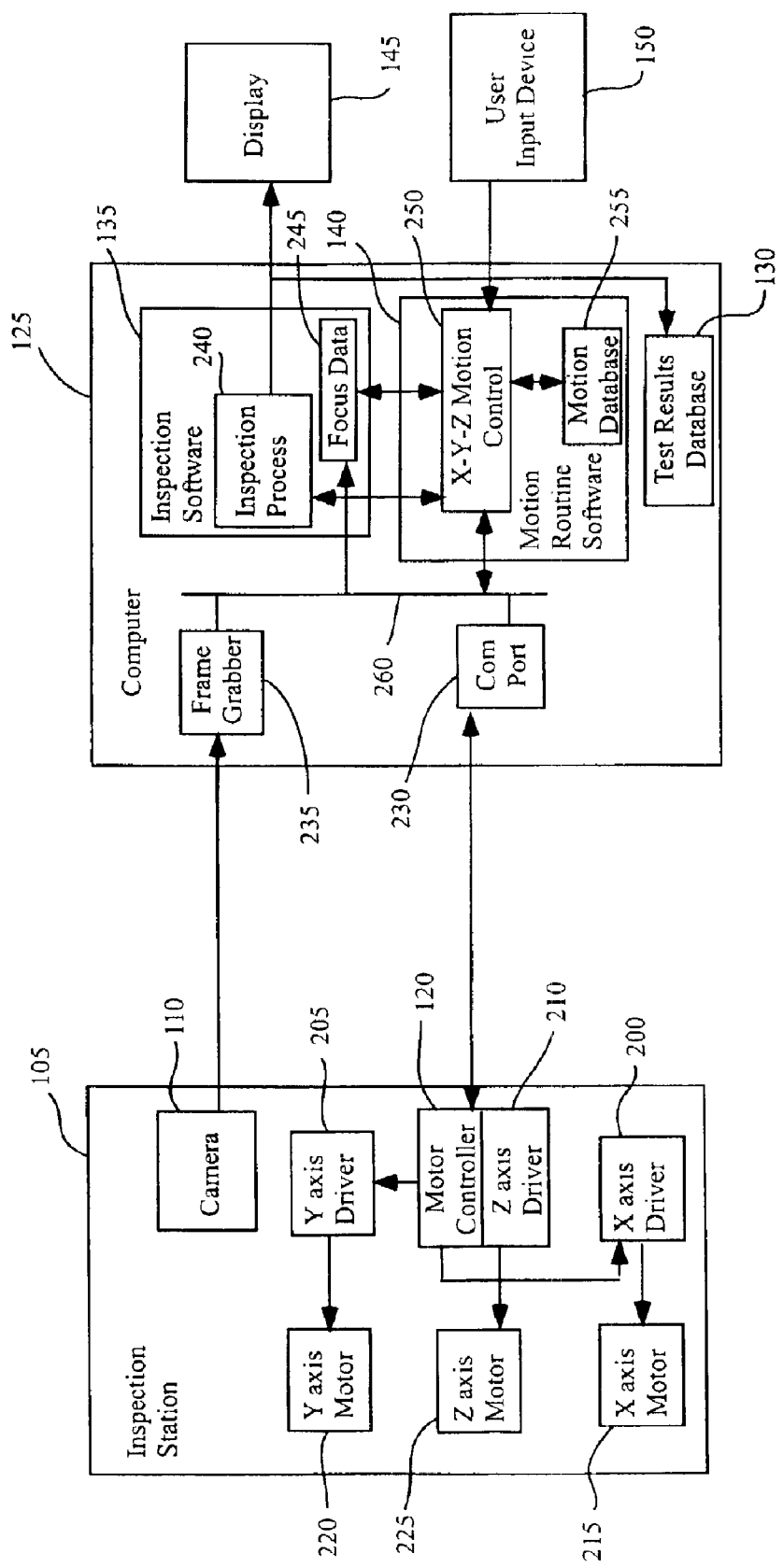
FIG. 2 is a lower level block diagram of the automated fiber optic inspection system of FIG. 1.

Referring next to FIG. 2, shown is a lower level block diagram of the automated fiber optic inspection system of FIG. 1.

In addition to that already shown in FIG. 1, shown are X, Y and Z axis drivers 200, 205, 210 and motors 215, 220, 225 which collectively make up the camera movement hardware 115 of FIG. 1. Also shown are a corn port 230, a frame grabber 235, an inspection process 240 and focus data module 245 within the inspection software 135. X-Y-Z motion control 250 and motion database 255 are shown within the motion routine software 140. A computer bus 260 is shown in the computer 125 as well.

The motion controller 120 is in electrical communication with the X, Y, and Z axis drivers 200, 205, 210, which are in turn in electrical communication with the X, Y, and Z axis motors 215, 220, 225. The motion controller 120 is also in electrical communication with the com port 230 in the computer 125 and the camera 110 is in electrical communication with the frame grabber 235 in the computer 125. The frame grabber 235 and com port 230 are electrically connected to the computer bus 260 and via the computer bus 260 are in communication with the focus data module 245 and the X-Y-Z motion control 250 within the inspection software 135 and motion control software 250, respectively. The inspection process 240 and focus data module 245 are logically connected to and are in duplex communication with the X-Y-Z motion control 250 within the motion routine software 140. The motion database 255 is also logically connected to and in communication with the X-Y-Z motion control 250.

The motion controller 120 controls each of the X, Y, and Z axis drivers 200, 205, 210, which in turn control their corresponding X, Y and Z axis motors 215, 220, 225. This allows full three dimensional movement of the camera 110. Movement in the Z axis is required for focusing, while movement in the X axis and Y axis allow movement of the camera to different connectors.

The com port 230 communicates control signals to the motion controller from the computer according to the X-Y-Z motion control 125 commands. The motion database 255 contains a motion routine for all the connectors to be inspected in a particular fixture and the X-Y-Z motion control uses the appropriate motion routine to determine which movement signals to send to the motion controller 120 for a particular connector within a fixture.

Advantageously, the fixture may be the same fixture used in other processing steps in the manufacture or processing of the connectors. Specifically, the fixture may be the same fixture used with a polishing machine used to polish the fiber surfaces within the fiber optic connector. As a result, a significant amount of manual handling is avoided because the connectors do not need to be removed from the fixture after polishing of the connectors prior to inspection of the connectors.

The present embodiment preferably accommodates a plurality of different fixture types from polishing machines from a plurality of different manufacturers.

Once a particular connector is inspected by way of the inspection process 240, this is communicated to the X-Y-Z motion control 250 to initiate the correct movement of the camera for further inspections, if any. The frame grabber 235 communicates image data from the camera 110 to the computer 125 which image date gets delivered internally into the focus data module 245. Focus data such as contrast values are computed in the focus data module and are communicated to the X-Y-Z motion control 250 for focusing purposes.

Figure 3:
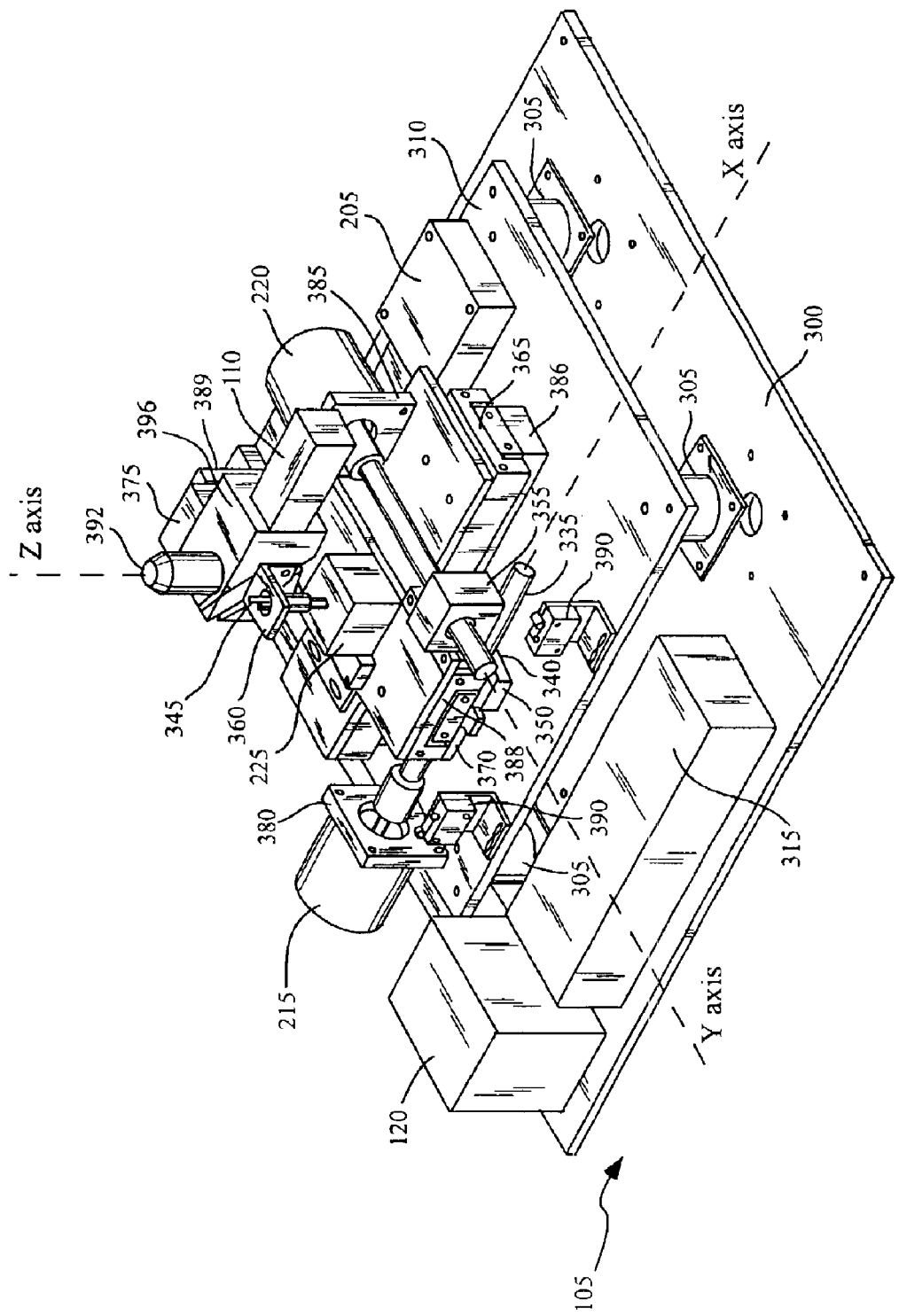
FIG. 3 is a top perspective view of a partially constructed inspection station of the automated fiber optic inspection system of FIG. 2.

Referring next to FIG. 3 shown is a top perspective view of a partially constructed inspection station 105 of the automated fiber optic inspection system of FIG. 2.

Shown is a base 300, vibration isolators 305, a mounting plate 310, a power supply 315, the motion controller 120, the X, Y and Z axis motors 215, 220, 225, lead screws 335, 340, 345, lead nuts 350, 355, 360 and stages 365, 370, 375. Also shown are X axis and Y axis motor mounts 380, 385, an X axis block 386, an X-Y adaptor plate 388, the Y axis driver 205, Z axis mount 389 and X axis limit switches 390. Lastly, shown are an objective lens 392, a digital camera 110, and an optical block 396.

The motion controller 120 and power supply 315 are mounted on the base 300. Four vibration isolators 305 (one not shown) are also mounted on the base 300 and the mounting plate 310 is attached on top of the vibration isolators 305 with one vibration isolator 305 positioned at each corner of the mounting plate 310.

Attached to the mounting plate 310 is the X axis block 386 with the X axis stage 365 slidably attached to it. Also attached to the mounting plate 310 is the X axis motor mount 380 to which the X axis motor 215 is attached. The X axis lead screw is operably attached to the X axis motor 215 and runs parallel lengthwise with the X axis stage 365. The X axis lead screw 335 goes through the X axis lead nut 350 which is attached to the X axis stage 365. Also attached to the mounting plate are the X axis limit switches 390 along side the X axis lead screw, and the Y axis driver.

Attached to the X axis stage 365 is the X-Y adapter plate 388 with the Y axis stage 370 slidably attached to it. The Y axis stage 370 runs lengthwise horizontally perpendicular to the X axis stage 365. Also attached to the X axis stage 365 is the Y axis motor mount 385 to which the Y axis motor 220 is attached. The Y axis lead screw 340 is operably attached to the Y axis motor 220 and runs parallel lengthwise with the Y axis stage 370. The Y axis lead screw 340 goes through the Y axis lead nut 355 which is attached to the Y axis stage 370.

Attached to the Y axis stage 370 is the Z axis mount 389 with the Z axis stage 375 slidably attached to it. The Y axis stage 370 runs lengthwise vertically perpendicular to the Y axis stage 370. Also attached to the Y axis stage 370 is the Z axis motor 225. The Z axis lead screw 345 is operably attached to the Z axis motor 225 and runs parallel lengthwise with the Z axis stage 375. The Z axis lead screw 345 goes through the Z axis lead nut 360 which is attached to the camera block 396. The camera block is in turn attached to the Z axis stage 375. On the side of the camera block is attached a digital camera 110 and an objective lens 392 is attached atop the camera block 396.

By way of operation each motor 215, 220, 225 turns a lead screw 335, 340, 345 through a lead nut 350, 355 360 that is attached to a slidable stage 365, 370, 375. For example, as the Y axis lead screw 340 is screwed through the Y axis lead nut 355 by the turning of the lead screw 340 by the Y axis motor 220, the Y axis motor 220 pulls the Y axis lead nut 355 axially (along the Y axis) toward or away from the Y axis motor 220 depending on the direction the Y axis motor 220 is turning. This is because the Y axis motor 220 is fixedly attached to the X axis stage 365 (which is only slidable along the X axis) while the Y axis lead screw 355 is attached to the Y axis stage (which is slidable along the Y axis). This, therefore, causes movement of the Y axis stage 370 along the Y axis when the Y axis motor 220 runs. The same principle applies to the X axis and Z axis motors 215, 225 as well. Since each stage sits atop the other, movement of a stage below will also move the stage above. The camera and the objective lens are attached to the top stage (or the Z axis stage 375) and thus can move in the X, Y or Z direction. The limit switches 390 limit how far the X axis stage can move by changing states, i.e., opening or closing, when movement limits are reached, thereby providing an indication to the motion control software and to the motors to stop movement of the X axis stage (and thereby prevent damage to the stages, fixtures, camera, etc.). There are also limit switches for the Y axis and Z axis, but these are not shown in FIG. 3. Thus, the motors 215, 220, 225 can move the camera 110 to any location within a 6"×6" square area within the X-Y plane, for example, and along the Z axis for focusing. This however, is not a fixed range and movement in the X-Y plane can be adjusted by changing the length of the X axis stage 365 and Y axis stage 370 and adjustment of the limit switches 390.

Figure 4:
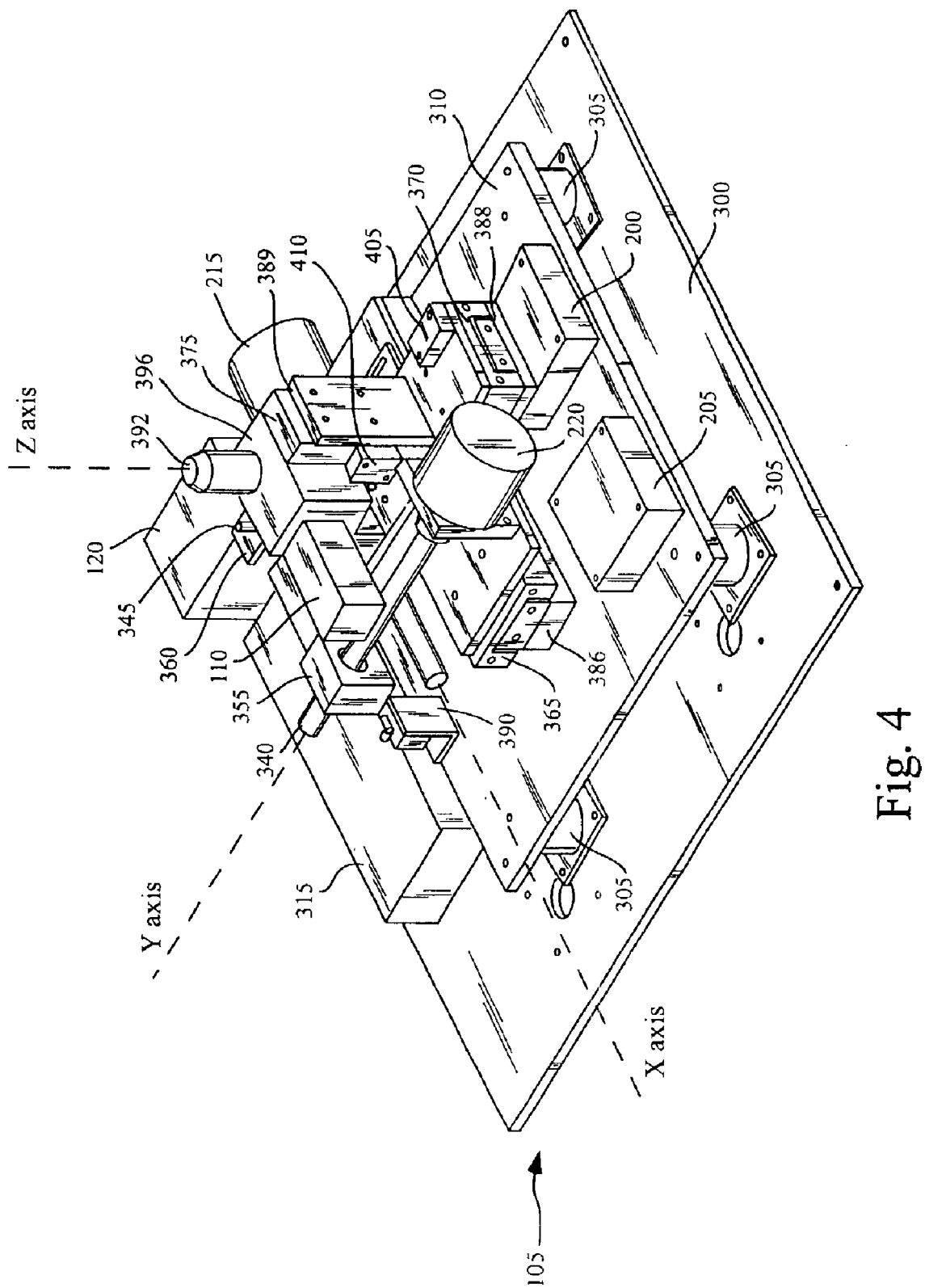
FIG. 4 is a top perspective view of the partially constructed inspection station of FIG. 3 rotated clockwise 90°.

Referring next to FIG. 4 shown is a top perspective view of the partially constructed inspection station 105 of FIG. 3 rotated clockwise 90°.

In addition to that already shown in FIG. 3, is the X axis driver 200, Y axis limit switch 405 and the Z axis limit switch 410. The Z axis driver is integrated with the motion controller 120. Also more visible is the Z axis stage 375 and the Z axis mount 389.

The X axis driver 200 is attached to the mounting plate 310 next to the Y axis driver 205. The Y axis limit switch 405 is mounted on the Y axis stage 370 and the Z axis limit switch 410 is mounted on the side of the Z axis stage 375.

The power supply 315 provides power to run the motion controller 120 which controls the drivers 200, 205, 210 that drive the motors 215, 220, 225. The Y and Z axis limit switches 405, 410 limit the extent to which the Y and Z stages 370, 375 can move.

Figure 5:
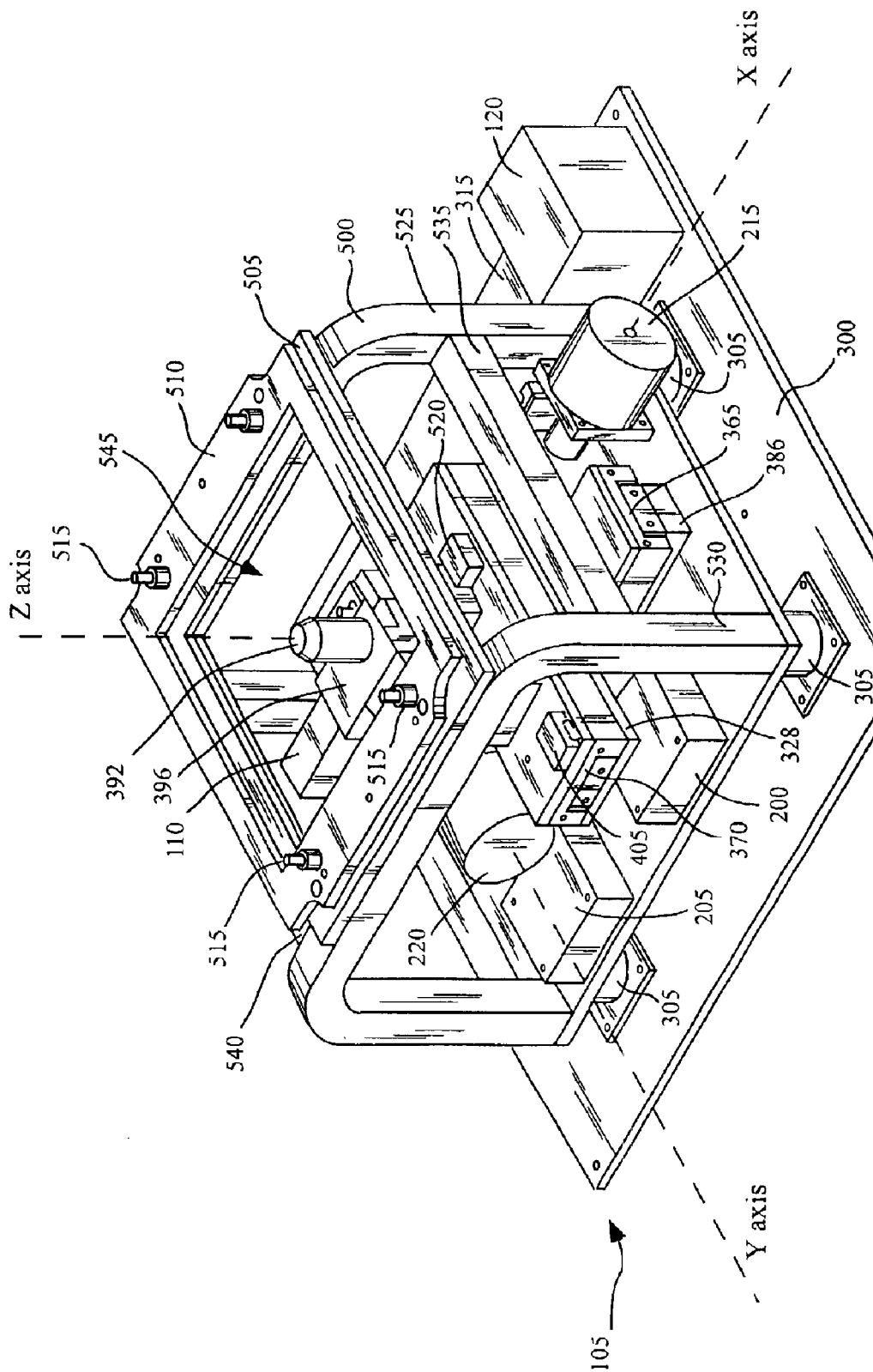
FIG. 5 is a top perspective view of the complete construction of the inspection station of FIG. 4 rotated clockwise 90°.
Figure 6:
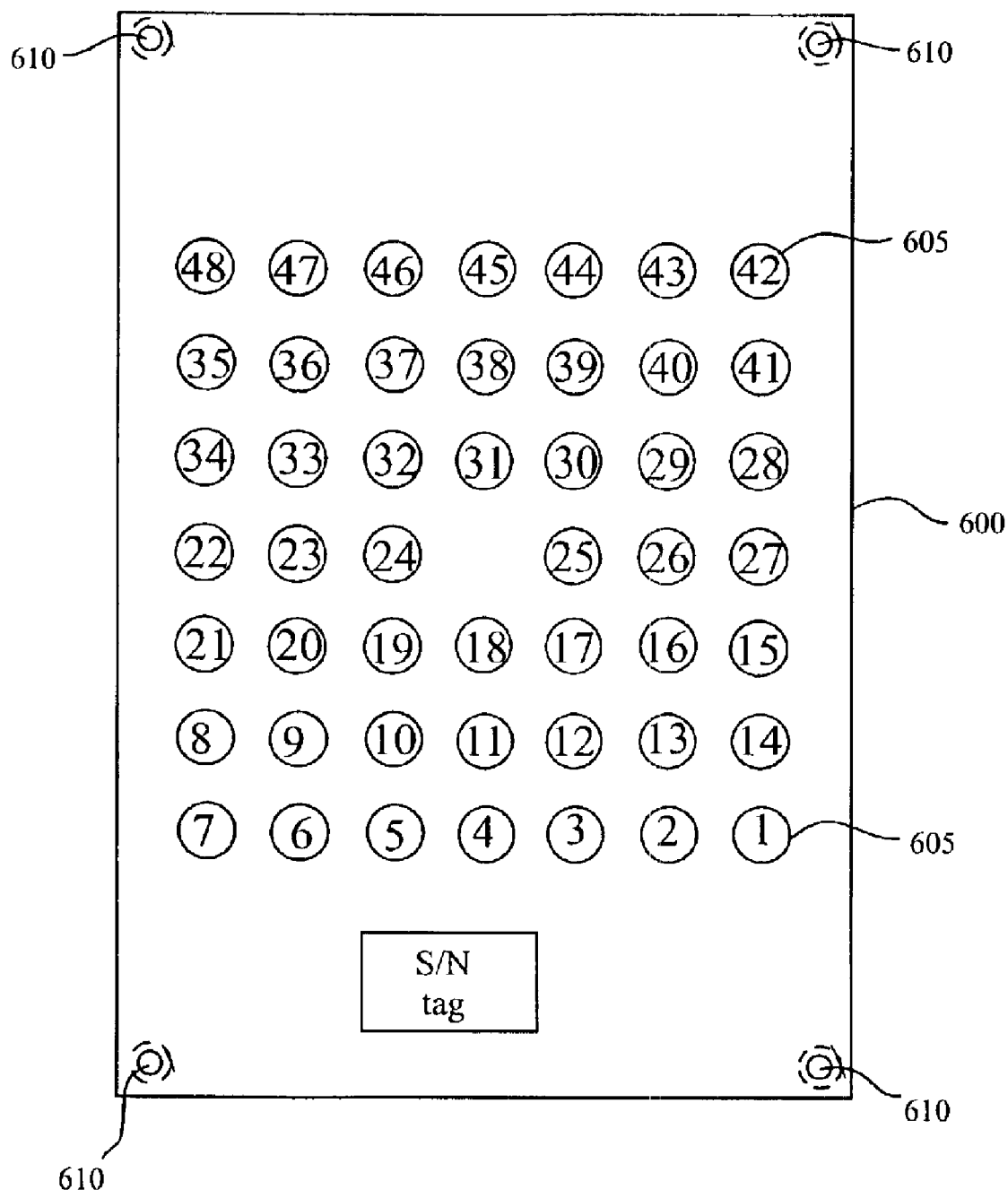
FIG. 6 is a top planar view of a sample fiber optic connector fixture for inspection by the inspection station of FIG. 5.

Referring next to FIG. 5 and FIG. 6, shown in FIG. 5 is a top perspective view of the complete construction of the inspection station 105 of FIG. 4 rotated clockwise 90' and shown in FIG. 6 is a top planar view of a sample fiber optic connector fixture 600 for inspection by the inspection station 105 of FIG. 5.

In addition to that already shown in FIG. 4, shown in FIG. 5 is a cage, an interface plate 505, a jig plate 510, and four locating pins 515. Also shown is the second Y limit switch 520. Shown in FIG. 6 is a sample fiber optic connector fixture 600 with a plurality of fiber optic connectors (1–48) 605 affixed thereto for inspection by the inspection station 105 of FIG. 5. The fixture 600 has four holes 610, one at each corner.

The cage 500 is made of two arched bars 525, 530 connected by lateral beams 535, 540 and is attached to the mounting plate 310. Attached flat to the top the cage is the interface plate 505. Attached on top of the interface plate is the jig plate 510. The jig plate 510 has four locating pins 515 for securing the fixture 600 (shown in FIG. 6) onto the inspection system. The jig plate 510 and the interface plate 505 have a square hole 545 through which the objective lens 392 can see fiber optic connectors within the fixture 600 once it is placed on the jig plate 510. The fixture 600 may be, and is intended to be, switched out with a variety of different types of fixtures from different manufacturers and placed on the inspection station 105 for inspection.

The jig plate 510 and locating pins 515 preferably can be adjusted to accommodate a plurality of fixtures from a plurality of manufacturers, such as manufacturers of polishing machines. As a result, the present embodiment can be used in conjunction with the same fixtures used within the polishing machines, and therefore, the connectors do not need to be removed from separate polishing machine fixtures and inserted into inspection system fixtures prior to inspection.

Thus, polishing of the connectors is preferably effected using a polishing machine having a fixture. And, the inspection using the inspection system of the present embodiment is preferably carried out (after polishing) using the same fixture. Any number of other pieces of processing equipment can precede the inspection system of the present embodiment in a fiber optic connector manufacturing or processing facility, and such other pieces of processing equipment may, in accordance with the present embodiment, share their fixture with the inspection system of the present embodiment, thereby achieving a similar advantage of not having to remove the connectors from one fixture (used for processing) and reposition the fixtures in another fixture (for inspection). After the connectors are inspected in the fixture, removed from the fixture and installed on a card edge, it is also desirable to inspect them once installed on the card edge. The inspection system of the present embodiment may be used to perform this inspection also as described below.

A variation of an automated fiber optic inspection system in accordance with some aspects of the present embodiment is described in co-pending U.S. patent application Ser. No. 10/177,924 filed Jun. 21, 2002 of Buzzetti for AUTOMATED FIBER OPTIC INSPECTION SYSTEM, incorporated herein by reference.

Figure 7:
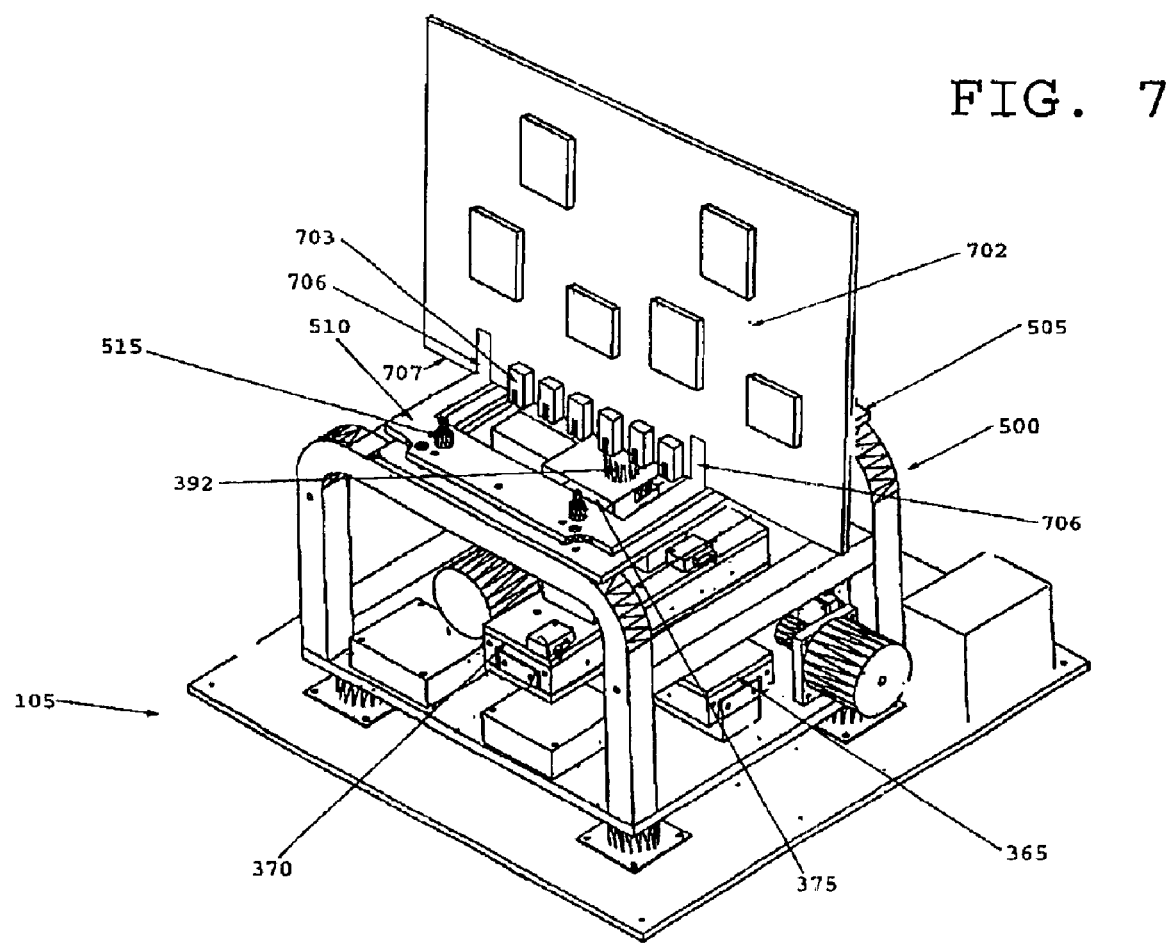
FIG. 7 is a top perspective view of a sample manufactured fiber optic card mounted on a modified version of the inspection station of FIG. 5 to inspect fiber optic connectors installed on the card edge according to an embodiment of the present invention.

Referring next to FIG. 7, shown is a top perspective view of an exemplary manufactured fiber optic card 702 mounted on a modified version of the inspection station 105 of FIG. 5 to inspect fiber optic connectors 703 installed on a card edge 707 according to an embodiment of the present invention.

In addition to that already shown in FIG. 5, shown in FIG. 7 are a modified jig plate 510 and a fiber optic card 702 having a plurality of fiber optic connector housings 703 along the card edge 707. For example, each housing 703 has four multi-fiber connectors installed, each connector typically having twelve fibers each. The jig plate 510 has card holders 706 operable for holding the card 702 securely in place such that the planar surface of the card 702 is perpendicular to the planar surface of the jig plate 510. Holding the card 702 in this fashion allows the objective lens 392 to see the face of the connectors 703 on the edge of the card 707 properly for inspection.

The jig plate 510 and card holders 706 preferably can be adjusted to accommodate a plurality of cards from a plurality of manufacturers. For example, some manufacturers may have larger or smaller cards with different numbers of connectors. The card holders 706 are preferably adjusted, such as by sliding the card holder 706 along slots (not shown) in the card holders 706, or by moving the card holders 706 so that an alternate set of holes (not shown) in the card holders 706 are used to secure the card holder 706 to the jig plate 510, to accommodate these sizes, or a separate jig plate may be used for each card. Also, some cards have pins that can be inserted into guide holes in the jig plate 510 created for those cards. Holding of the card 702 in place can be accomplished by any number of mechanisms, but preferably allows the card 702 to be removed and replaced quickly and holds each card 702 in the jig plate 510 in relatively the same position as it does other identical cards, e.g., within approximately 0.002 inch.

Also, the length of certain cards is accommodated by providing a range of motion along the X axis sufficient to allow the objective lens 392 to reach each connector 703 on the card 702. This is accomplished by changing the length of the X axis stage 365 and adjustment of the limit switches 390 appropriately (shown in FIG. 4). For inspecting connectors on fiber optic cards, the range of motion is preferably at least 12" along the X axis and 2" along the Y axis, but may be adjusted for different cards. The objective lens 392 preferably has a focal distance of approximately one inch to focus sufficiently on the connectors in the housings 703 on the card edge 707.

Figure 8:
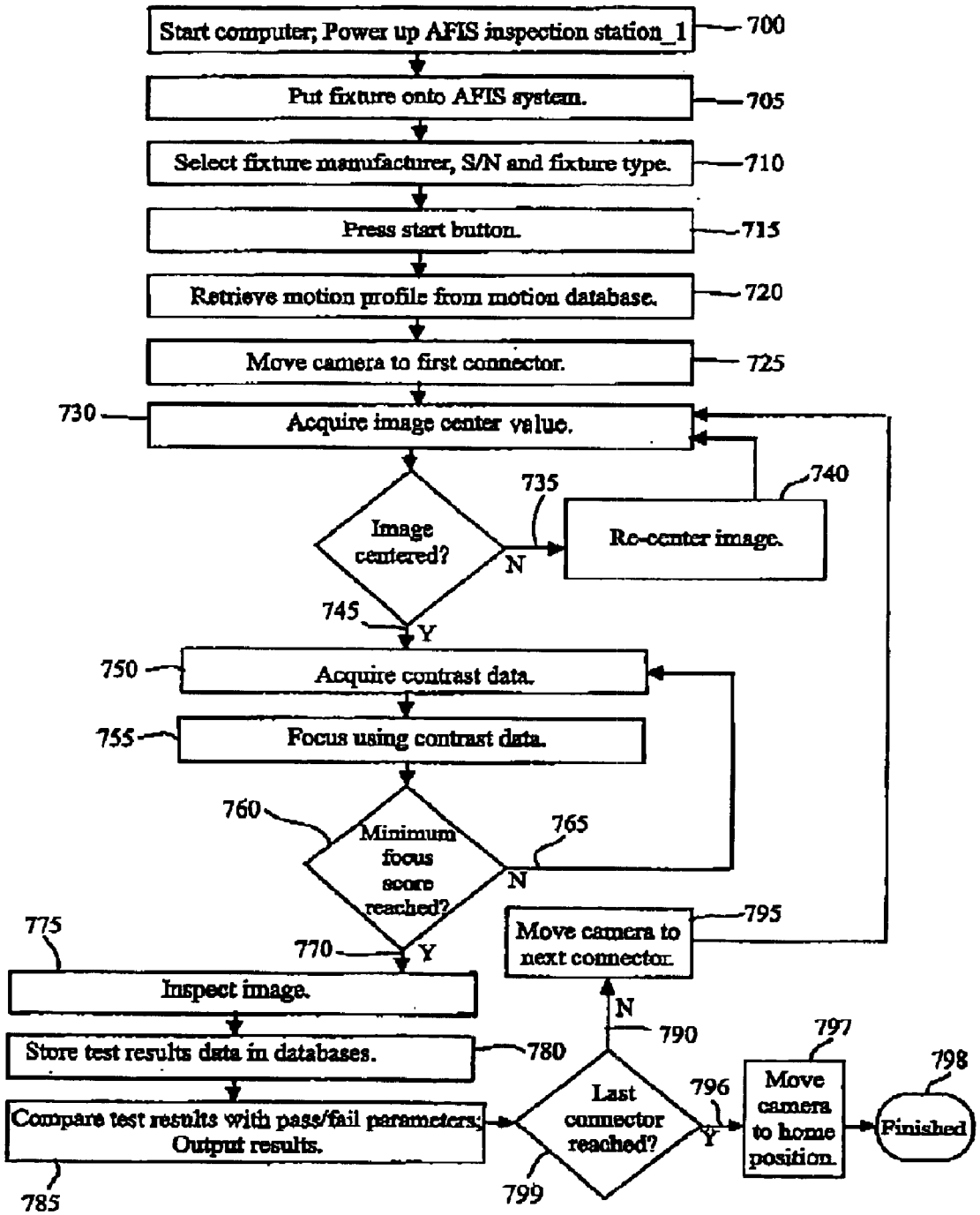
FIG. 8 is a process-flow chart for the automated fiber optic inspection system of FIG. 1 and FIG. 2.

Referring next to FIG. 8 shown is a process flow chart for the automated fiber optic inspection system of FIG. 1 and FIG. 2, and in particular the automated fiber optic inspection system of FIGS. 3 through 5, used in combination with a fixture, such as is shown in FIG. 6. FIG. 1, FIG. 2, and FIG. 7 will also be referred to in conjunction with FIG. 10.

First, the computer 125 is started 700 and the inspection station 105 is powered up 700. The user then puts 705 a fixture 600 (shown in FIG. 6) or a card 702 (shown in FIG. 7) onto the inspection station 105. The user selects 710 manufacture, serial number and fixture type for the fixture 600 or card 702 being used by use of the user input device 150 such as a mouse for instance. The user then pushes a start button 715.

The motion routine software 140 employs motion profiles stored in the motion database 255. Each motion profile is for the particular manufacturer, serial number and/or fixture type (plate) or card 702 being used. In response to, e.g., the fixture or card being used (i.e., in response to the user entering the fixture or card information), the motion routine software 140 retrieves 720 a specified motion profile from the motion database 255. The specified motion profile specifies the first individual connector on the fixture or card to be inspected, the order in which other individual connectors on the fixture or card are to be inspected, and the movements that the camera must make in order to be in position to inspect each individual connector. (These movements may, for example, be in the nature of coordinates to which the camera must be moved, and may, for example, define a serpentine pattern for movement of the camera from the first individual connector in a fixture, through all of the other individual connectors, to the last individual connector.)

The camera 110 is then automatically moved 725 to the first connector of the plurality of connectors 605 in the fixture 600 or card 702 in accordance with the motion profile. An image center value of the connector image is then automatically acquired 730 by the inspection software 135 and passed to the motion routine software 140. The image center value is the location of the center of the image. If the image is not already centered above the lens 735 of the camera (as a result of the camera having been moved in accordance with the motion profile), then the motion routine software 140 re-centers 740 the image using the image center value and the new image center value is acquired 730. This loop repeats until the image is centered 745.

Figure 9:
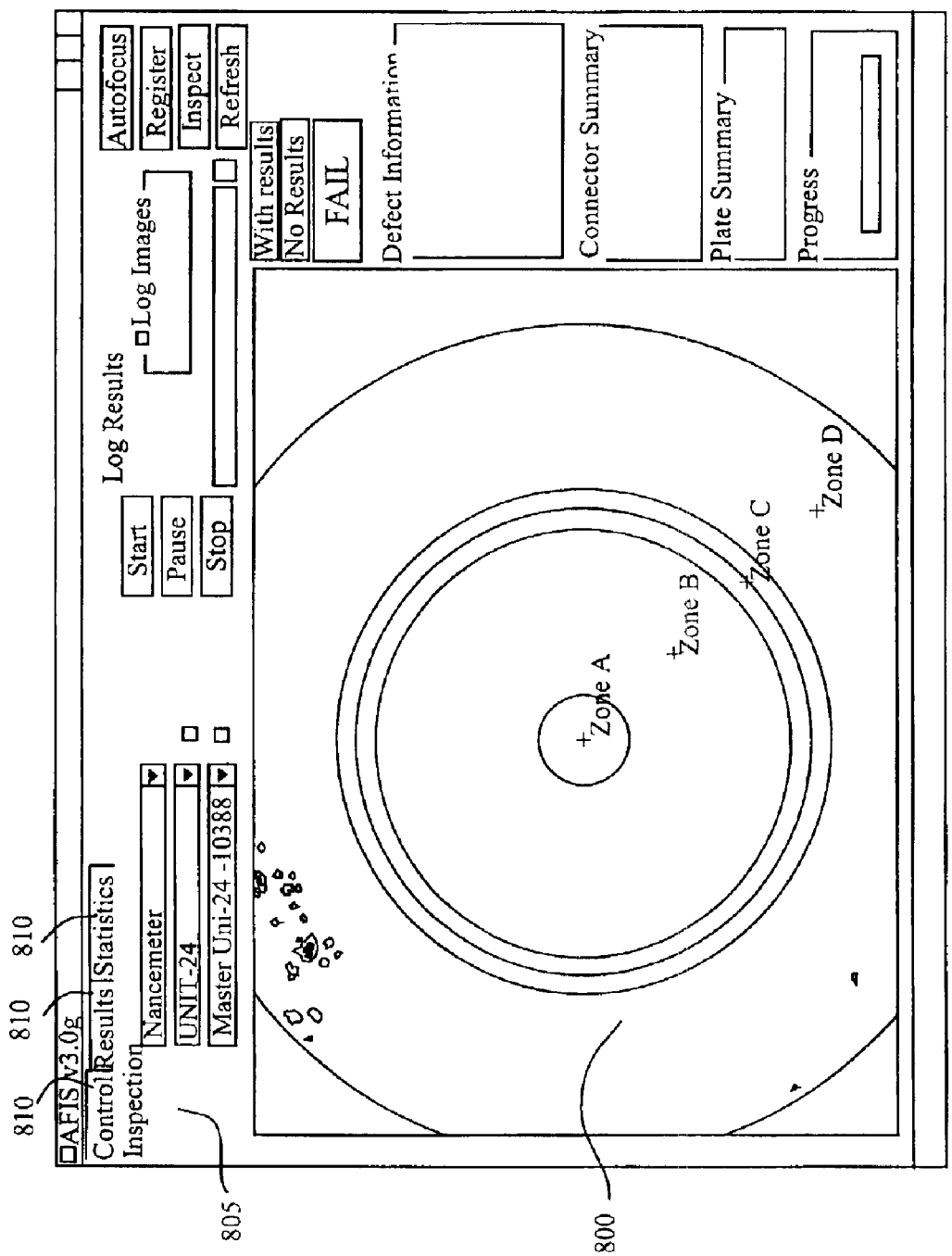
FIG. 9 is a screen shot of the graphical user interface and graphical display of test results of the automated fiber optic inspection system of FIG. 1, FIG. 5 and FIG. 7.

Next, the inspection software 135 acquires contrast data from the image for focusing purposes 750. The motion routine software 250 uses the contrast data to determine how much to move the camera 110 along the Z axis to focus 755 the image. Then the contrast data is obtained to determine a focus score and check whether the score meets a minimum threshold 760, preferably 90. If the threshold is not met 765, the system continues to focus using the contrast data 755 until the minimum threshold is met 770. Then the inspection software 135 (available from, e.g., COGNEX software company) automatically inspects 775 the connector image looking for defects such as scratches, spots and boundaries (a spot type component in the area between the fiber and ferrule interface). The inspection software 135 finds and catalogs defects and anomalies in the surface of the fiber optic connector and then stores 750 these test results in a database 130. These results are compared 785 to preset pass/fail parameters entered by the user. The inspection results are then output graphically to a computer display 145 (as shown in FIG. 9. If the connector 30 is not 790 the last connector in the fixture 600, the camera 110 is automatically moved 795 to the next connector by the motion routine software 140 and the process is started over from the step of acquiring the image center value 730. This sub-process loops 799 until the last connector in the fixture 600 has been reached 796. The camera 110 is then moved to the home position 797 which finishes 798 the process.

Referring next to FIG. 9, shown is a screen shot of the graphical user interface and graphical display of test results of the automated fiber optic inspection system of FIG. 1 and FIG. 7.

Shown are the connector image and associated defects 800, a user input dialog box 805 and tab buttons 810 to view different result formats. The user may see the results in a variety of formats including statistical trends and analysis of defects.

More specifically, the motion routine software includes a reporting module for extracting information from the test results database and for displaying or otherwise outputting the information having been extracted. The information includes, e.g., the fixture type or card model, the serial number of the fixture or card, the position (or location) within the card or fixture (or plate) of the connector being tested, the manufacturer, the date of the inspection, and the results of the inspection, e.g., the number of scratches, pits, and boundaries, and whether the connector passed or failed inspection.

The reporting module includes a reporting wizard, which prompts a user for a date range of interest, a manufacturer, and/or a fixture or card serial number, and then directs the reporting module to extract information from the database on the basis of the a date range of interest, a manufacturer, and/or a fixture or card serial number. Using the extracted information, the reporting module may, for example, display a line graph of the number of failures per day over the date range of interest. Using such a line graph, the user is able to visually observe any anomalies or trends (such as an increasing number of failures, either slowly, over time, or suddenly) that may indicate a change in quality of the connectors, or equipment used to process the connectors. Different levels of reports may be generated to include those that identify a particular type of defect in a particular fiber in a particular connector in a particular housing on a certain position on a certain model of fiber optic card from a manufacturer. The reporting module may, for example, display a line graph as described above to spot trends in defect type or defect frequency of a fiber in a certain location on a certain model of fiber optic card.

Another report that can be generated by the reporting module is a daily report, such as that which lists all of the inspections for a particular day, including the fixture type or card model, the serial number, the manufacturer and test results. Included in the daily report may be, for example, summary information, including the number or fixtures or cards (or, e.g., connectors and fibers) inspected, the number of connectors that passed inspection, the number of connectors that failed inspection, e.g., a pass/fail ratio, and a total number of defects detected.

Additional reports may include monthly reports and pass/fail reports for selected days or months.

Furthermore, the reporting module is capable of outputting extracted information in the form of a data file, such as a comma delimited file, or an EXCEL spreadsheet file. In this way, the extracted information can be displayed, summarized, graphed and the like using third-party software packages.

Also notice in FIG. 9 that the result of whether the inspection passed or failed is clearly displayed and the test may be started, stopped or paused at the touch of a button.

Figure 10:
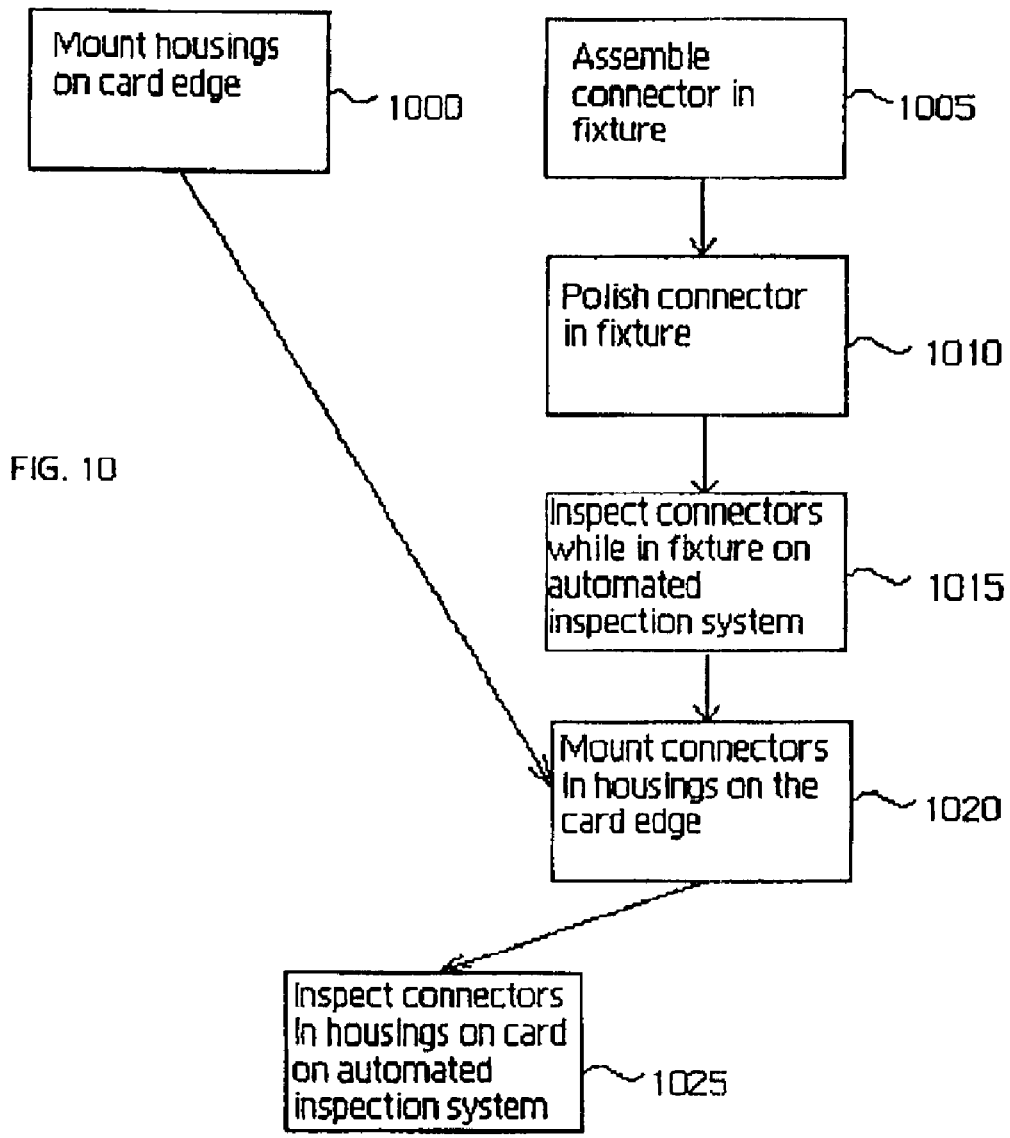
FIG. 10 is a process flow chart for manufacturing and inspecting fiber optic connectors on fiber optic connector cards according to the present invention.

Referring next to FIG. 10, shown is a process flow chart for manufacturing and inspecting fiber optic connectors on fiber optic connector cards according to one embodiment of the present invention, such as shown in FIG. 1, FIG. 2, and FIG. 7.

First, typically in a way known to those of ordinary skill in the art, fiber optic connector housings are mounted on a card edge 1000 and at least one connector to be installed on the card in the card housings is assembled in a fixture 1005. The connectors in the fixture are then polished 1010. Then the connectors in the fixture are inspected 1015 on the automated fiber optic inspection system (such as that shown in FIGS. 3 through 5), as described above in reference to FIG. 8, according to one embodiment of the present invention. At least one of the connectors is then mounted in one of the housings on the card edge 1020 (as is known to those of ordinary skill in the art). Finally, the connectors in the housings on the card edge are inspected 1025 on the automated fiber optic inspection system (such as that shown in FIG. 7), in accordance with the method described above in reference to FIG. 8, according to one embodiment of the present invention, except that the fixture is not employed, but instead the connectors are held within the housings on the card edge.

While the invention herein disclosed has been described by means of specific embodiments and applications thereof, numerous modifications and variations could be made thereto by those skilled in the art without departing from the scope of the invention set forth in the claims.

What is claimed is:

1. A method for vision inspection of optical connectors comprising:

placing a plurality of optical connectors into a corresponding plurality of fiber optic housings on an edge of a card;

retrieving a motion profile for said card from a motion profile database;

centering an image of one of the plurality of optical connectors by moving a camera relative to the card using the motion profile;

focusing the camera on the one of the plurality of optical connectors;

inspecting the one of the plurality of optical connectors using the camera;

centering an image for another of the plurality of optical connectors by moving the camera relative to the card using the motion profile;

focusing the camera on the other of the plurality of optical connectors; and inspecting the other of the plurality of optical connectors.

2. The method of claim 1 further comprising repeating the step of inspecting the other of the plurality of optical connectors until all the connectors in the card have been inspected.

3. The method of claim 2 wherein the step of repeating comprises:

repeating the steps of centering an image for another of the plurality of optical connectors by moving the camera relative to the card using the motion profile, focusing the camera on the other of the plurality of optical connectors, and inspecting the other of the plurality of optical connectors until all the entire plurality of optical connectors has been inspected; and moving the camera between connectors according to a motion profile for the card.

4. The method of claim 3 wherein the steps of retrieving a motion profile for said card from a motion profile database, centering an image of one of the plurality of optical connectors by moving a camera relative to the card using the motion profile, focusing the camera on the one of the plurality of optical connectors, inspecting the one of the plurality of optical connectors using the camera, centering an image for another of the plurality of optical connectors by moving the camera relative to the card using the motion profile, and focusing the camera on the other of the plurality of optical connectors are all controlled by software running on a processor.

5. The method of claim 3 wherein each connector has multiple fibers.

* * * * *